(12) United States Patent
Koerber (10) Patent No.: US 8,087,529 B2
(45) Date of Patent: Jan. 3, 2012

(54) SAFETY CLOSURE FOR STEAM PRESSURIZED CONTAINERS OF HOUSEHOLD APPLIANCES

(75) Inventor: René Koerber, Leutenbach (DE)

(73) Assignee: Reutter Metallwarenfabrik GmbH, Waiblingen (DE)

( * ) Notice: Subject to any disclaimer, the term of this patent is extended or adjusted under 35 U.S.C. 154(b) by 1049 days.

(21) Appl. No.: 11/667,358

(22) PCT Filed: Nov. 2, 2005

(86) PCT No.: PCT/EP2005/011693
§ 371 (c)(1),
(2), (4) Date: Dec. 18, 2007

(87) PCT Pub. No.: WO2006/050845
PCT Pub. Date: May 18, 2006

(65) Prior Publication Data
US 2008/0210690 A1    Sep. 4, 2008

(30) Foreign Application Priority Data

Nov. 9, 2004 (DE) .................... 20 2004 017 790 U
Mar. 19, 2005 (DE) .................... 20 2005 004 798 U (51) Int. Cl.
*B65D 51/16* (2006.01)
*B65D 51/18* (2006.01)
(52) U.S. Cl. ......... 220/203.22; 220/203.19; 220/203.27; 220/303
(58) Field of Classification Search .................. 220/303, 220/203.22, 203.19, 203.27, 203.29, 367.1
See application file for complete search history.

(56) References Cited

U.S. PATENT DOCUMENTS

| 4,033,475 A | 7/1977 | Evans |
| 4,887,733 A * | 12/1989 | Harris ................. 220/203.06 |
| 5,108,001 A * | 4/1992 | Harris ................. 220/203.06 |
| 5,941,407 A | 8/1999 | De'Longhi |
| 6,095,363 A * | 8/2000 | Harris et al. .......... 220/203.26 |
| 6,179,148 B1* | 1/2001 | Harris ................. 220/288 |
| 6,276,312 B1* | 8/2001 | Summan et al. ........ 123/41.54 |

(Continued)

FOREIGN PATENT DOCUMENTS

DE    1 585 854    10/1970

(Continued)

*Primary Examiner* — Mickey Yu
*Assistant Examiner* — Niki Eloshway
(74) *Attorney, Agent, or Firm* — Bacon & Thomas, PLLC (57) ABSTRACT

A safety closure for steam-pressurized containers of household appliances, such as steam irons, steam cleaners and the like. The safety closure is provided with an inner part that can be screwed onto the filling hole of the container, and with an outer part in the shape of a grip cap. A coupling element is provided between the inner part and the outer part and can be axially displaced against the effect of a spring by a drive controlled by the internal container pressure in such a manner that the outer part and the inner part are interconnected in a rotationally fixed manner when the container is not pressurized The connection being neutralized when the container is pressurized. The aim of the invention is to provide a safety closure whose components that are exposed to the pressure are more solid and therefore function more reliably and whose drive at the same time serves as a protection from an inadmissibly high excess pressure. For this purpose, the drive for the coupling element is configured by a valve support which is axially mobile inside the inner part and which can be placed on the coupling element against the axial effect of a spring.

7 Claims, 6 Drawing Sheets

U.S. PATENT DOCUMENTS

| | | | |
|---|---|---|---|
| 6,796,451 B2* | 9/2004 | Harris | 220/203.26 |
| 2005/0077295 A1* | 4/2005 | Reutter | 220/288 |
| 2005/0082289 A1* | 4/2005 | Reutter | 220/203.27 |

FOREIGN PATENT DOCUMENTS

| | | |
|---|---|---|
| DE | 34 01 156 A1 | 7/1984 |
| DE | 44 30 822 C1 | 11/1995 |
| DE | 696 07 679 T2 | 8/2000 |
| DE | 100 34 762 A1 | 1/2002 |
| DE | 101 32 661 A1 | 1/2003 |
| EP | 0 337 528 B1 | 10/1989 |
| EP | 0 400 514 A1 | 12/1990 |
| EP | 0 744 566 A1 | 11/1996 |
| EP | 1 298 370 A1 | 4/2003 |
| GB | 2 194 780 A | 3/1988 |

* cited by examiner

SAFETY CLOSURE FOR STEAM PRESSURIZED CONTAINERS OF HOUSEHOLD APPLIANCES

TECHNICAL FIELD

The present invention relates to a safety closure for containers which are under steam pressure, for devices in connection with household applications, such as steam irons, steam cleaning devices and the like.

BACKGROUND DISCUSSION

In connection with such a safety closure known from EP 0 337 528 B1, the drive mechanism, which is controlled by the interior container pressure, moves the coupling member axially in a plate, wherein the exterior circumference of the plate is provided with protrusions which, in accordance with the axial position, engage grooves arranged on the interior circumference of the exterior element, or the gripping cap, or come out of engagement therewith. Such an arrangement for operating a coupling is relatively unstable. Furthermore, no measures are provided for reducing an impermissible overpressure being built up in the container.

SUMMARY OF THE INVENTION

It is the object of the present invention to provide a safety closure for a container which is under steam pressure, for household appliances of the type mentioned at the outset, whose pressure-charged components are more stably designed and therefore operate more dependably, and whose drive mechanism is simultaneously used for providing safety against an impermissibly large overpressure.

It has been achieved by means of the measures in accordance with the invention that the drive mechanism for the coupling member is constituted by a stable component in the form of the valve support, and that the pressure, at which the coupling connection between the exterior element and the interior element needs to be released, can be set more unequivocally and accurately. Moreover, in connection with a diaphragm drive mechanism, security against an impermissibly high overpressure which endangers the safety closure is assured by means of the combination with a valve disk.

Advantageous embodiments of the arrangement, or of the axial guidance of the valve support, ensue from a valve support which on its exterior circumferential is provided with a sealing element which acts radially against the interior circumferential side of the interior element and which, in the position in which the valve support is displaced under pressure, axially seals against a contact shoulder of the interior element, and/or wherein the pressure-free position of rest of the valve support is constituted by a radially inner locking ring as a stop in the interior element.

By means of a pressure relief valve maintained inside the valve support which is movable against the axial effect of an overpressure compression spring, it has moreover been achieved that, in case of a build-up of interior container pressure sufficient for releasing the coupling connection, a possibly additionally, but impermissible, build-up of interior container pressure can be detected and in particular reduced. This takes place in that, with an axially displaced valve support, and therefore a released coupling connection, a further axial movement of the pressure relief valve in respect to and relatively to the valve support can take place, so that a venting connection between the container interior and the exterior is opened.

An advantageous embodiment of the pressure relief valve ensues from a pressure relief valve which axially passes through the valve support and rests sealingly with its valve disk on the end of the valve support facing the coupling member, and on its end facing away is provided with a spring holder plate between which and an interior shoulder of the valve support the overpressure compression spring, embodied as a compression spring, is maintained.

It is achieved by means of a coupling member, on its exterior circumferential side, is connected with the exterior element in an axially movable manner, but fixed against relative rotation. As a result, the coupling member is continuously connected with the circumference of the exterior element, or the gripping cap, so that the release of the coupling connection takes place exclusively between the coupling member and the interior element.

Advantageous embodiments of the coupling member result from a coupling element embodied as a basket element standing on its head, whose bottom is biased by a restoring compression spring, which is supported on the exterior element, and whose free edge area is provided on the circumference inside with tooth elements which, depending on the axial position of the coupling member, are in or out of engagement with the counter-tooth elements on the circumferential outside of the interior element, and/or further with an actuating ring of lesser diameter at an axial distance from the bottom of the basket element, which is fastened in a suspended manner on struts or strips, which are connected with the bottom of the basket element and are distributed along the circumference, and is located opposite the annular front of the valve support at a short distance. Because the basket element is provided with openings on the circumference in the direction toward its actuating ring of smaller diameter, which is arranged suspended and concentrically in respect to the shell face, it has been advantageously achieved that when excess pressure is vented off, hot steam cannot reach the gripping cap, which is here made of plastic.

An advantageous embodiment of the holding device of the interior element on the exterior element results from holding the interior element axially in the exterior element, but circumferentially movable by means of an annular flange on the exterior circumference, and with the annular flange having axial bores distributed over the circumference. It has been provided here in an advantageous manner that the axial bores offer a path to the exterior, which is of considerable advantage in connection with the safety venting function.

Advantageous designs of the embodiment of the valve disk ensue from an embodiment in the shape of a hood which constitutes on its inner end facing away from the annular contact face of the overpressure compression spring a radially interior axial guidance device for a diaphragm slide of the diaphragm drive mechanism, and/or from an axial stop for the diaphragm slide formed by a shoulder of the inner end of the valve disk.

Preferred embodiments of the stationary coupling element, or of the movable coupling member, are provided by axially locking the interior element on the circumference with a stationary coupling element, and/or, by holding the movable coupling member, radially fixed against relative rotation on the outside, but axially movable, in the exterior element, with a radially centered axial cylinder whose bottom is residently pressed against the diaphragm slide.

Further constructive advantages result from a stationary coupling element provided radially on the inside with fastening strips against which the overpressure spring rests, and/or a stationary coupling element fastened on the interior element and axially held in a suspended manner in the exterior element by means of an annular flange on the exterior circumference, but circumferentially movable the characteristics of claim 15 and/or 16.

A preferred embodiment of the coupling connection ensues from an axially movable coupling member provided with axial pegs which engage bores in the bottom of the hood-like stationary coupling element.

BRIEF DESCRIPTION OF THE DRAWINGS

Further details of the invention can be taken from the following description, in which the invention is described in greater detail by means of the exemplary embodiments represented in the drawings. Shown are in.

DETAILED DISCUSSION

The safety closure 10, or 110, represented in the drawings in accordance with two exemplary embodiments, for containers which are under steam pressure, is intended for devices in connection with household applications, such as steam irons, steam cleaning devices and the like.

Figure 1:
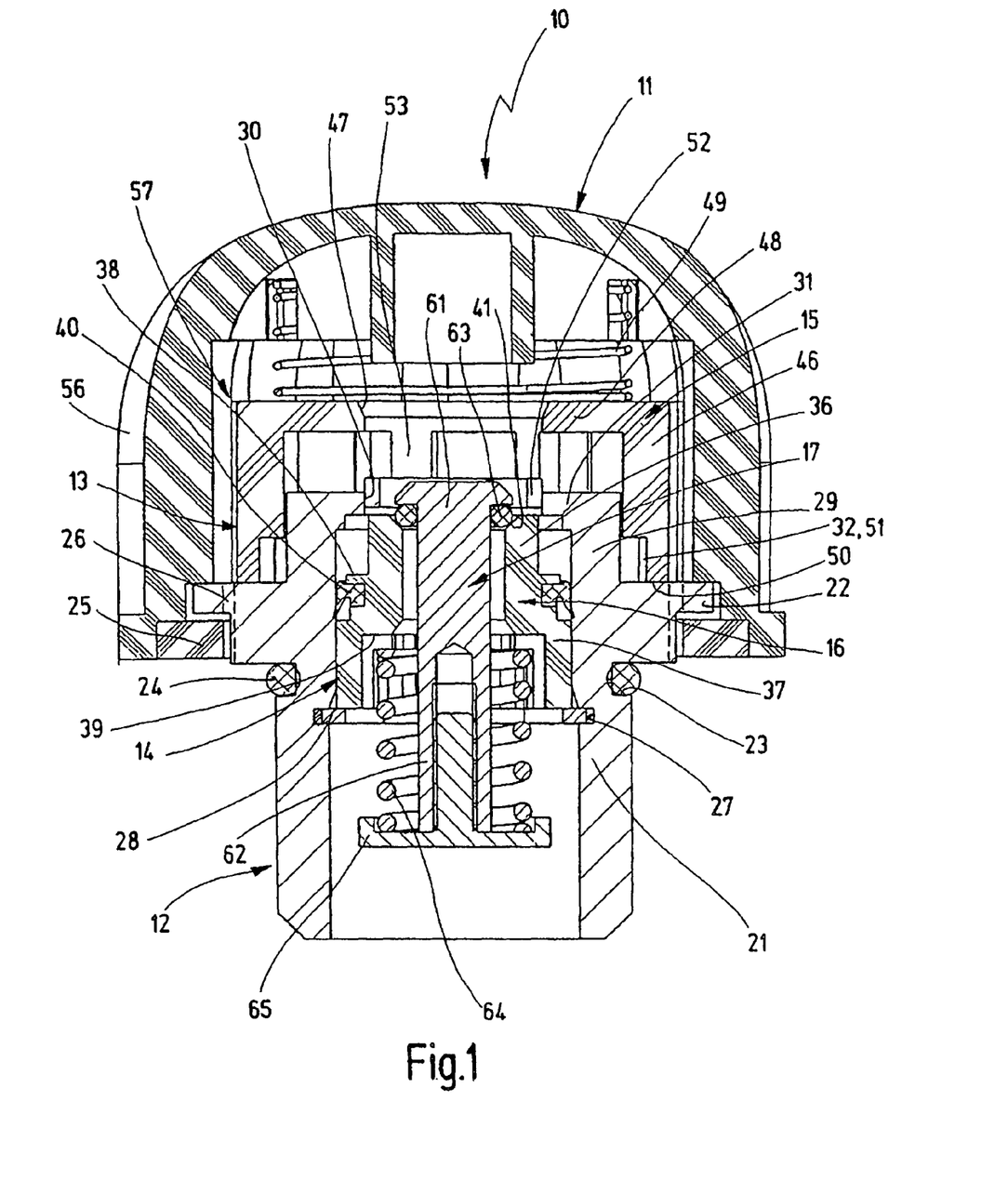
FIG. 1, a safety closure for containers which are under steam pressure, for household applications in accordance with a first exemplary embodiment of the present invention in an unpressurized state and in a longitudinal sectional representation, FIG. 2, a representation of the safety closure corresponding to FIG. 1, but in an activated position in response to an existing pressure, FIG. 3, a representation of the safety closure corresponding to FIG. 1, but in a position in which the impermissible overpressure existing in the container can be vented, FIG. 4, a safety closure for containers which are under steam pressure, for household applications in accordance with a second exemplary embodiment of the present invention in an unpressurized state and in a longitudinal sectional representation, FIG. 5, a representation of the safety closure in a longitudinal sectional representation, turned by a few degrees, but in an activated position in response to an existing pressure, and FIG. 6, a representation of the safety closure corresponding to FIG. 4, but in a position in which the impermissible overpressure existing in the container can be vented.
Figure 2:
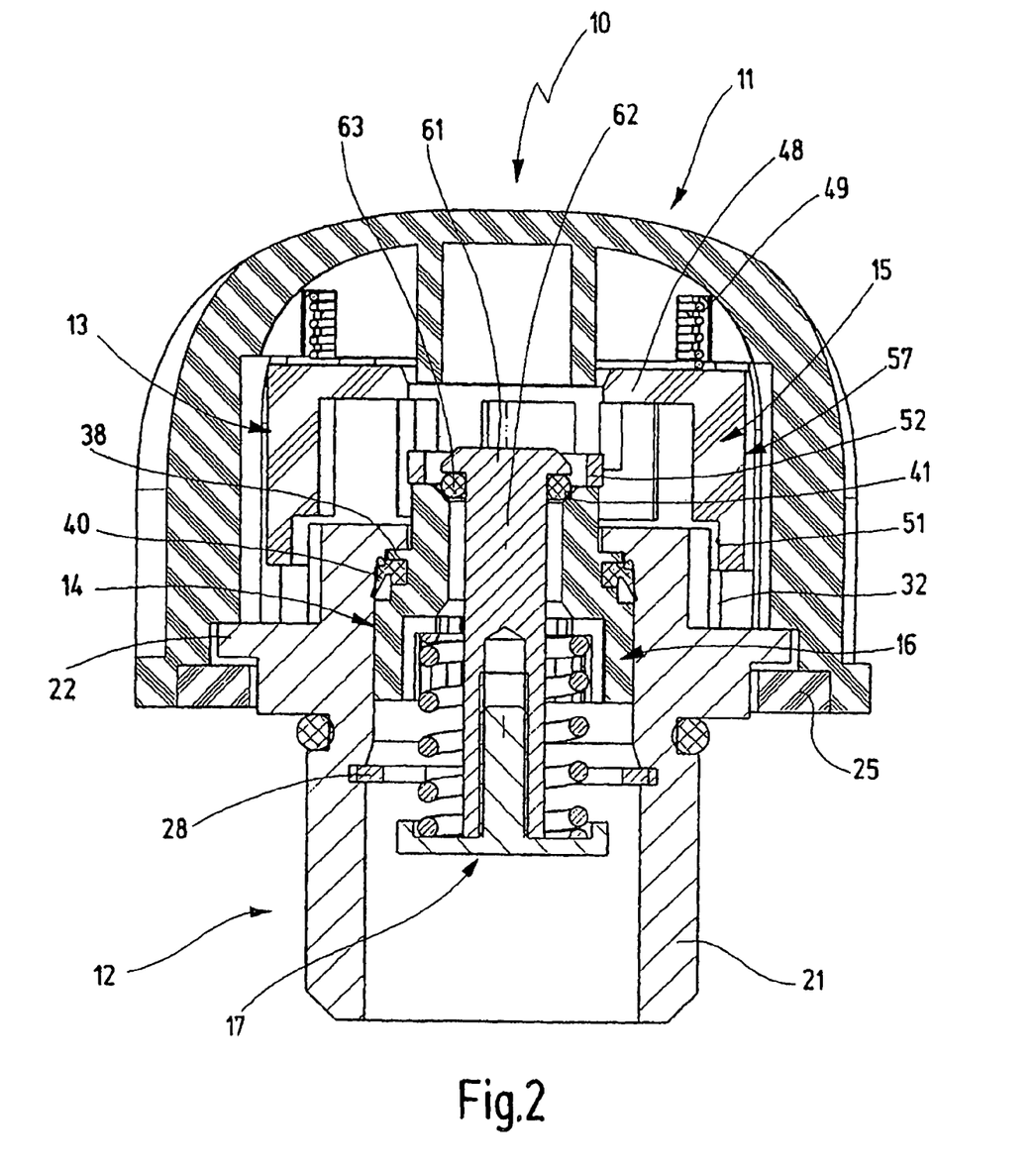
Figure 3:
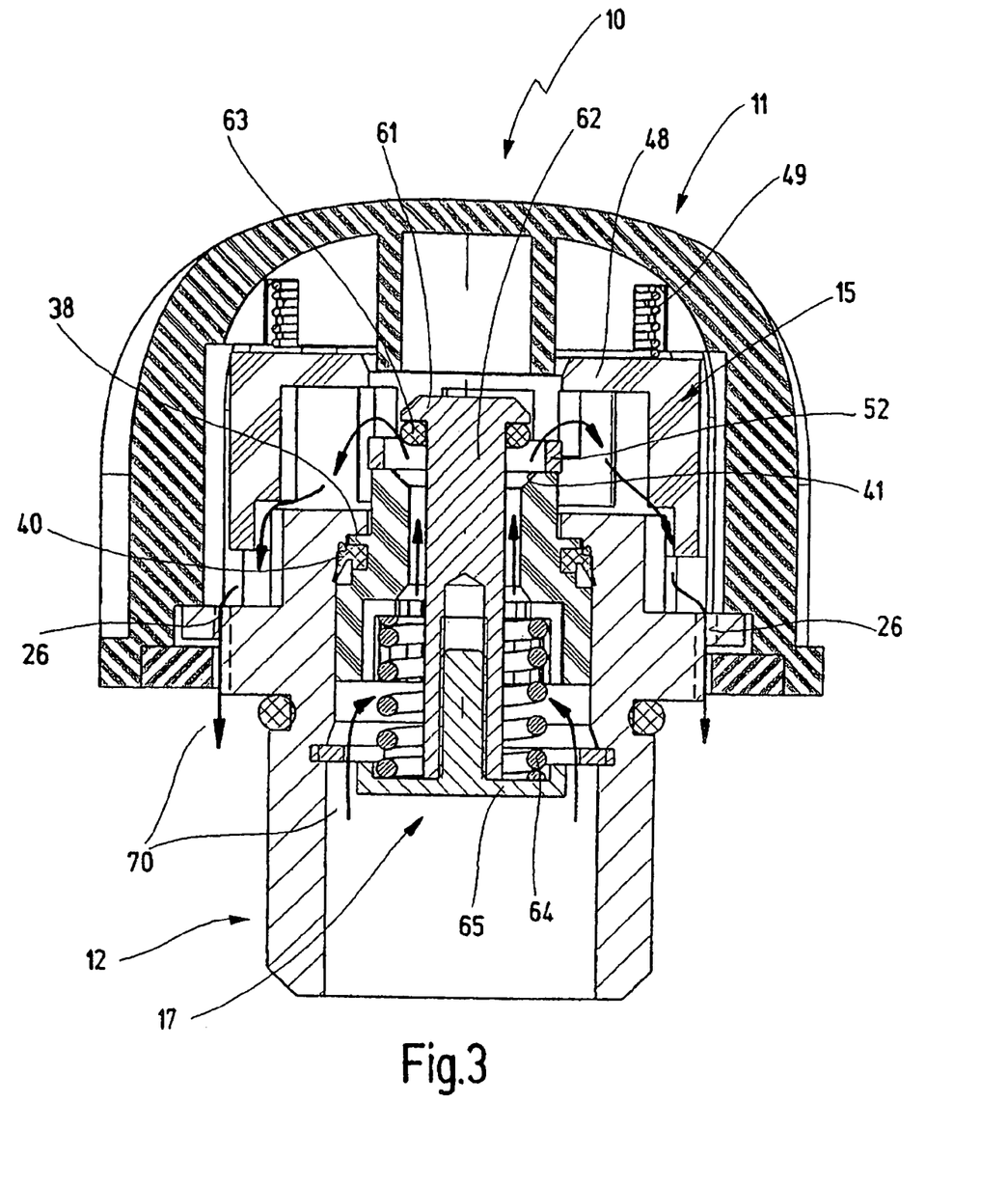

The safety closure 10 in accordance with FIGS. 1 to 3 has an exterior element in the form of a gripping cap 11, preferably made of plastic, as well as an interior element 12, which can be connected, preferably in a screwed manner, with a container, not represented. A coupling connection 13 is provided between the exterior element, or gripping cap 11, and the interior element 12 which, depending on whether or not pressure exists in the container, releases or provides a connection, fixed against relative rotation, between the gripping cap 11 and the interior element 12. A drive mechanism 14 for a coupling member 15 of the coupling connection 13, which is in operative connection with the interior of the container, is constituted by a valve support 16, which is axially movable between two end positions in the interior element 12.

The safety closure 10 moreover has a pressure relief valve 17, which is maintained inside the valve support 16 and is axially movable together with the latter, as well as relative to it.

The interior element 12, metallic in this case, which will also be called a valve housing in what follows, has a shaft 21 with a exterior thread (not shown), for a screwed fastening in a filler opening of a pressure container (not shown). An exterior circumferential flange 22 adjoins the shaft 21, which is maintained rotatably movable, but axially fixed, in the exterior element 11, and between which and the shaft 21 an O-ring 24 is held in an annular groove 23 and is used for sealing the valve housing 12 in respect to the container opening.

The radially stepped circumferential flange 22 is used for the suspended fastening in the open underside of the gripping cap 11, which for this purpose is provided with a holding ring 25 extending below the area of greater diameter of the circumferential flange 22. The circumferential flange 22 is provided with axial bores 26 (shown in dashed lines), which are arranged distributed over the circumference and on a radius bordering the interior circumference of the holding ring 25. Below the O-ring 24, the shaft 21 has an interior annular groove 27, into which a locking ring 28, for example in the form of a Seeger ring, has been inserted. A cylindrical shoulder 29 of approximately the same diameter follows in the extension of the shaft 21 on the other side of the circumferential flange 22 and is covered by a bottom 31 provided with a concentric axial bore 30. On its exterior circumference and directly above the circumferential flange 22, the cylindrical shoulder 29 is provided with protrusions or teeth 32, which are arranged evenly distributed over the circumference, project radially, extend over a relatively short axial length and are a part of the releasable coupling connection 13.

The valve support 16, which is metallic here, is movably arranged inside the valve housing 12. In accordance with FIGS. 1 to 3, the hollow valve support 16 has a lower element 36 of larger diameter and an upper element 37 of lesser diameter. Because of this, both an exterior shoulder 38, as well as an interior shoulder 39, result between the two elements 36 and 37. The exterior diameter of the element 36 of larger diameter corresponds to the interior diameter of the cylindrical shoulder 29 of the valve housing 12, and the exterior diameter of the element 37 of lesser diameter is slightly less than the interior diameter of the through-bore 30 in the bottom 31 of the valve housing 12. Because of this, the valve support 16 can be axially moved between a position of rest, represented in FIG. 1, in which the lower annular front rests against the locking ring 28, and an active position, represented in FIG. 2, in which the exterior shoulder 38 is pressed against an annular shoulder of the bottom 31.

In the intervening area between the two elements 36 and 37, the valve support 16 has a shaped seal 40, which has a sealing lip which acts radially against the interior circumference of the valve housing 12, and an axial sealing ring element acting in the direction toward a contact shoulder of the valve housing 12. Furthermore, at its mouth opening provided at the element 37 of lesser diameter, the valve support 16 is provided with an interior cone seat 41.

The coupling member 15 of the coupling connection 13 has the approximate shape of a basket, made here from a plastic material and standing on its head in the installed position. The coupling member, or the basket 15, has a solid radially outer cylindrical shell 46 and a bottom 48, provided with a concentric bore cutout 47. A restoring compression spring 49 is supported on the bottom 48. At the other end, it is supported on the interior of the gripping cap 11. The restoring compression spring 49 presses the free annular face 50 of the shell 46 against the top of the circumferential flange 22 of the valve housing 12. In an area close to its annular face 50, the shell 46 has protrusions, or teeth 51, which point inward, extend over a defined axial area and constitute a part of the coupling connection 13 and, in the position of rest represented in FIG. 1, engage corresponding axial channels, or grooves, of the valve housing 12, and in this way provide a connection between the coupling member 15 and the valve housing 12, which is also releasable and fixed against relative rotation. A permanent connection, fixed against relative rotation, results from an axially rotatable toothed connection 57, not represented in detail.

The coupling member 15, or the basket, has an actuating ring 46 radially inside the shell 46 and at an axial distance from the bottom 48 which, in the position of rest in FIG. 1, is arranged at a lesser distance from the opening annular face of the element 37 of lesser diameter of the valve support 16 and has an exterior diameter corresponding to the latter and is also located partially inside the bore cutout 30 of the bottom 31 of the valve housing 12. The actuating ring 52 is fastened on the bottom 48 of the basket, suspended by means of axially extending strips 53.

The gripping cap 11 made of plastic is shaped like a dome, is provided with gripping grooves 56 and has, on its stepped open end provided with the holding ring 25, an annular groove receptacle for the circumferential flange 22 of the valve housing 12 for an axial connection with play and a circumferential rotating movement.

The pressure relief valve 17, which projects past both ends of the valve support 16, is provided inside the valve support 16. The pressure relief valve 17 has a valve disk 61, whose exterior diameter is greater than a valve slide 62, wherein an O-ring 63, which encloses the valve slide 62, is provided at the underside of the valve disk 61 and, in the position of rest represented in FIG. 1, makes possible a seal between the pressure relief valve 17 and the valve support 16.

An overpressure compression spring 64 is responsible for the sealing effect, one side of which rests against a spring holder plate 65 screwed into the free end of the valve slide 62. The other end of the pressure spring 64 is supported against the interior shoulder 39 of the valve support 16.

The functioning of the safety closure 10 screwed onto a container is as follows:

In the position of rest of the valve support 16 represented in FIG. 1, the container is free of pressure, so that a coupled connection 13, fixed against relative rotation, exists between the gripping cap 11 and the valve housing 12, so that the safety closure 10 can be screwed onto, or unscrewed from the container.

If pressure builds up in the container, which means that the water in the container has been converted at least partially into steam, the valve support 16, together with the pressure relief valve 17, is axially displaced toward the gripping cap 11 against the effect of the restoring compression spring 49 into the active position represented in FIG. 2. This axial movement corresponds to the axial movement for releasing the coupled connection 13, i.e. to bring the teeth 32 and grooves 51 out of engagement with the valve housing 12, or the coupling member 15, so that the gripping cap 11 turns freely without engagement with the valve housing 12, and unscrewing the safety closure 10 from the container is not possible in this pressure state. Movement of the coupling member 15 takes place in that the pressure-charged valve support 16 axially moves the actuating ring 52, and therefore the basket.

The restoring compression spring 49 can only move the coupling member 15 back into a position of rest allowing a coupled connection when external, or normal, pressure again prevails in the container, the water under steam pressure has cooled off again.

If during the active position (FIG. 1) of the valve support 16 the pressure inside the container should further increase for whatever reasons in such a way that the overpressure being created by this could lead to bursting of the container, the pressure relief valve 17 is axially moved against the action of the overpressure compression spring 64, in this case no longer together with the valve support 16 but, since the latter is located at the stop, relative to it, as can be seen in FIG. 3. This axial movement of the pressure relief valve 17 in relation to the valve support 16 results in the loosening of the sealed connection between the valve support 16 and the pressure relief valve 17, so that a blowout path, or venting path, between the interior of the container, or of the valve housing 12, and the outside is opened. This blowout path, or venting path, leads from inside the shaft 21, which is in communication with the container, and the annular chamber between the pressure control valve 17 and the valve support 16 through the opened valve seat, as well as through the radial openings between the strips 53, which maintain the actuating ring 52 on the basket, and then back between the shell 46 of the basket and the cylindrical shoulder 29 of the valve housing 12, as well as through the axial bores 26 in the circumferential flange 22 toward the outside of the gripping cap 11 and to the exterior (arrows 70).

After the overpressure has been vented in this way, the overpressure compression spring 64 pushes the pressure relief valve 17 back into its active position in accordance with FIG. 2, in which it seals together with the valve support 16.

Figure 4:
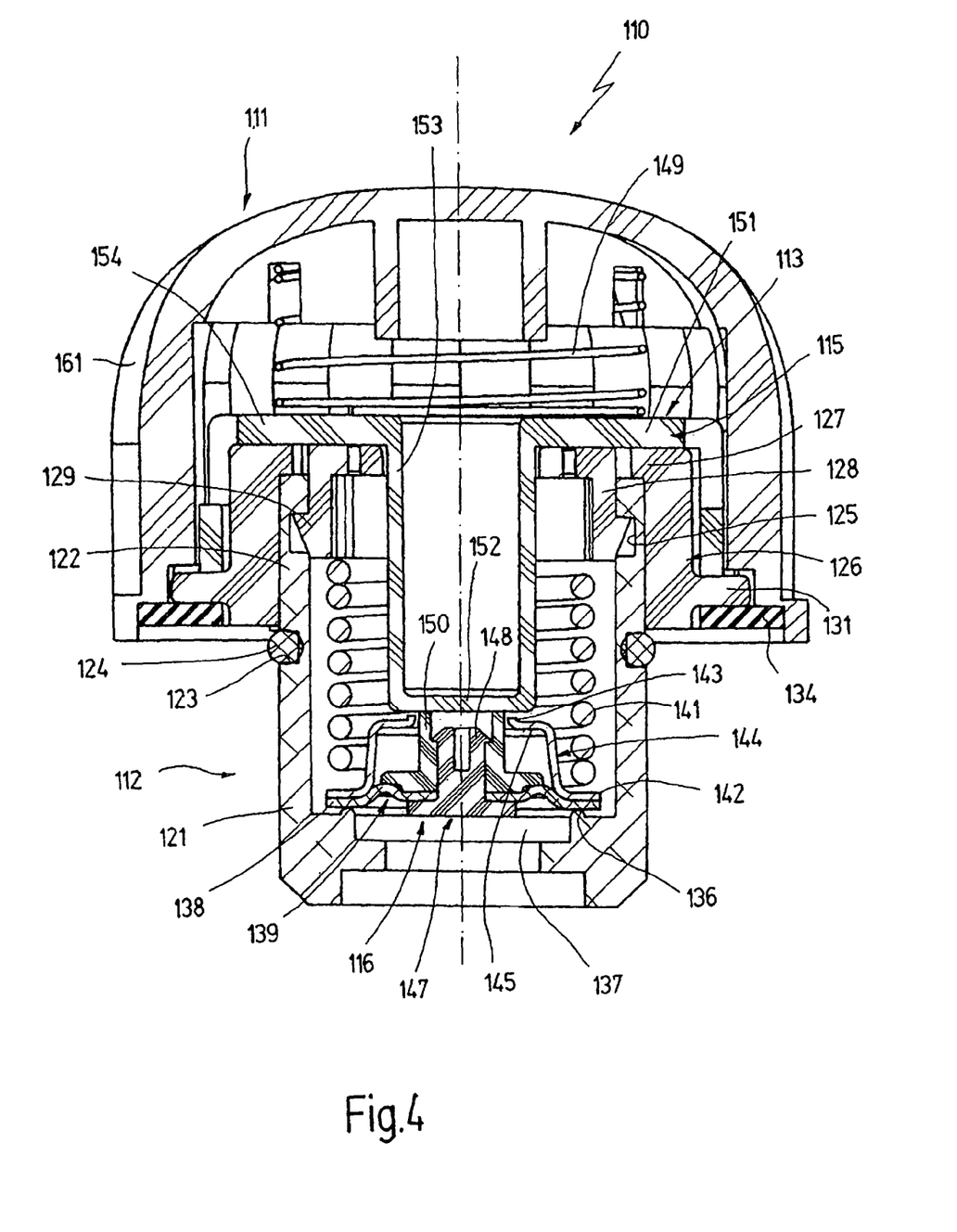
Figure 5:
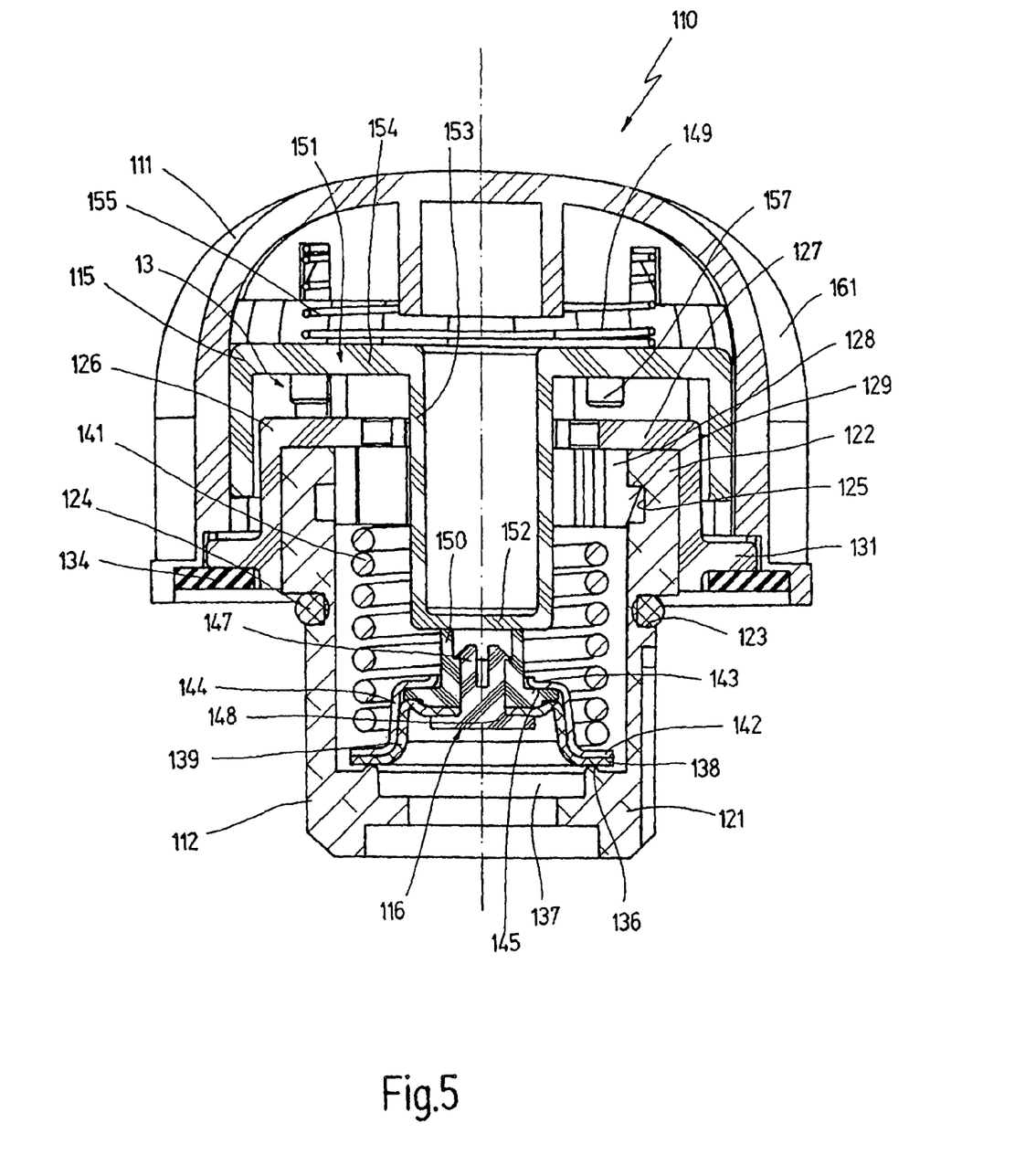
Figure 6:
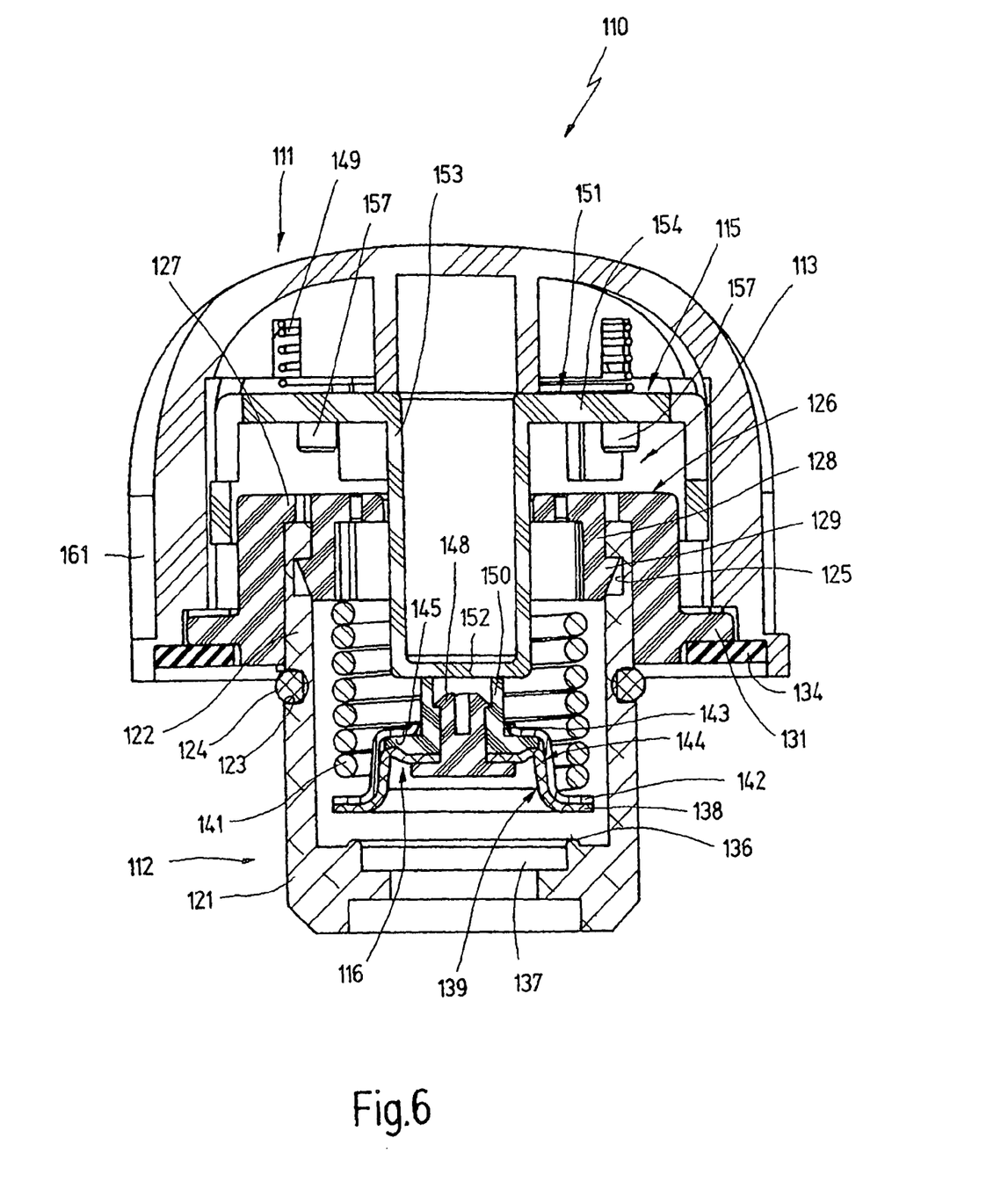

The safety closure 110 in accordance with FIGS. 4 to 6 has an exterior element in the form of a gripping cap 111, preferably made of plastic, as well as an interior element 112, which can be connected, preferably in a screwed manner, with a container, not represented. A coupling connection 113 is provided between the exterior element, or gripping cap 111, and the interior element 112 which, depending on whether or not pressure exists in the container, releases or provides a connection, fixed against relative rotation, between the gripping cap 111 and the interior element 112. A drive mechanism for a coupling member 115 of the coupling connection 113, which is in operative connection with the interior of the container, is constituted by a diaphragm arrangement 116, which is axially movable between two end positions in the interior element 112. The safety closure 110 moreover has a pressure relief valve 117, which is also maintained inside the interior element 112 and is combined with the diaphragm arrangement 116.

The interior element 112, here made of plastic, which will also be called a valve housing in what follows, has a shaft 121, provided with an exterior thread, not represented, for a screwed fastening in a filler opening of a non-represented pressure container. A cylinder element 112 of increased diameter and slit on the circumference, adjoins the shaft 121, between which and the shaft 121 an O-ring 124 is maintained in an annular groove 123 and is used for sealing the valve housing 112 in respect to the opening of the container. A hood-shaped connecting element 126 has been fixedly attached on top of the cylinder element 112 in such a way that it can be moved neither axially, nor in the circumferential direction, in respect to the interior element 112. For this purpose, the connecting element 126, which is a stationary part of the coupling connection 113, has strips 128, which extend in the interior of the cylinder element 122 radially inward and axially downward from its bottom 127 and which, with respective radially directed teeth 129, lockingly engage a corresponding inner cutout 125 in the cylinder element 122. The connecting element 126 moreover has a circumferential flange 131, which is used for the suspended fastening of the interior element 112 in the open underside of the gripping cap 111. For this purpose, the gripping cap 111 is provided with a holding ring 134, which extends underneath the circumferential flange 131.

Within its shaft 121 extending into the non-represented container, the valve housing 112 has an interior annular sealing face 136 surrounding an opening 137 into the container. In the resting, or in the active position, the radially outer edge 138 of a diaphragm 139 of the diaphragm arrangement 116 is pressed on the annular sealing face 136 by an overpressure compression spring 141, whose other end is supported on the strips 128 of the connecting element 126. A radially outer annular edge 142 of a valve disk 144 is located between the edge 138 of the diaphragm 139 and the respective end of the overpressure compression spring 141, and extends in a hood-shaped manner inside the overpressure compression spring 141 and is provided on its end facing away from the annular edge 142 with a radially inward drawn annular guide 143. The diaphragm arrangement 116 has a diaphragm slide 147, which is designed in two parts. The area of the diaphragm 139 surrounding a centered opening is clamped between an inner, T-shaped part 148 and an outer hollow T-shaped part 150, which can be locked together with the latter. Between its radially inner edge and its radially outer edge, the diaphragm 139 is embodied in a wave shape in order to be able to perform a radial movement, in the course of which the diaphragm slide 147 is guided in the guidance device 143 of the valve disk 144.

The movable coupling member 115 of the coupling connection 113, which is made of plastic here, has a hood element 151 with a hollow cylinder 153, which has been drawn inward in a centered manner and is provided with a bottom 152. While the hood element 151 of larger diameter extends around and over the connecting element 126, the cylinder 153 of lesser diameter extends centered through the connecting element 126 and the overpressure compression spring 141 axially to the diaphragm slide 147. In the state of rest in accordance with FIG. 4, the cylinder bottom 152 of the axially movable coupling member 115 is pressed on the diaphragm slide 147 and its annular front face on the circumferential flange 131 of the connecting element 126 by a compression spring 149, which is supported on one side on the annular bottom 154 of the hood element 151 and on the other side in the gripping cap 111.

In the course of the radial movement of the coupling member 115 relative to the connecting element 126, which is fixedly connected with the interior element 112, a connection, which can be decoupled and is fixed against relative rotation, with the connecting element 126, or the interior element 112, results. For this purpose the annular bottom of the hood element 151 is provided with several, axially inward directed pegs 157 (FIG. 5) which, in the position of rest represented in FIG. 4, are in engagement in a non-represented manner with corresponding bores in the bottom 127 of the connecting element 126 and in this way also form a releasable connection, fixed against relative rotation, between the coupling member 115 and the interior element 112. A continuous connection, fixed against relative rotation, between the gripping cap 111 and the coupling member 115 results from an axially movable toothed connection, not represented.

The gripping cap 111 made of plastic is shaped like a dome, is provided with gripping grooves 161 and has, on its stepped open end connected with the connecting element 126, an annular groove receptacle for the circumferential flange 131 of the connecting element 126 for an axial connection with play and a circumferential rotating movement.

The functioning of the safety closure 110 screwed onto a container is as follows:

In the position of rest of the diaphragm arrangement 116 represented in FIG. 4, the container is free of pressure, so that a coupled connection 113, fixed against relative rotation, exists between the gripping cap 111 and the valve housing 112, so that the safety closure 110 can be screwed onto, or unscrewed from the container. If pressure builds up in the container, which means that the water in the container has been converted at least partially into steam, the diaphragm 139 of the diaphragm arrangement 116 is axially moved upward relative to the overpressure compression spring 141 until an annular flange of the hollow T-part 150 rests against a shoulder 145 of the valve disk 44. In the process the diaphragm slide 147, which also moves along with this, presses on the cylinder element 153 of the coupling member 115, which also moves upward against the action of the compression spring 149 (FIG. 5). The coupling member 115 is displaced into its active position by this, which means that the coupled connected 113 has been released, i.e. the bores and pegs 157 of the connecting element 126, or of the coupling member 115 have been brought out of engagement, so that the gripping cap 111 turns freely without engagement with the valve housing 112 and unscrewing the safety closure 110 from the container is not possible in this pressure state.

The restoring compression spring 149 can only move the coupling member 115 back into a position of rest which makes possible the coupled connection when external, or normal, pressure again prevails in the container, the water under steam pressure has cooled off again.

If during the active position (FIG. 5) of the diaphragm arrangement 116 the pressure inside the container should further increase for whatever reasons in such a way that the overpressure being created by this could lead to bursting of the container, the valve disk 144 used as a pressure relief valve is axially moved against the action of the overpressure compression spring 141. This takes place together with the diaphragm arrangement 116, which has already been pressed against the valve disk 144 (FIG. 6). This axial movement of the pressure relief valve 117, or 144, together with the diaphragm arrangement 116, results in the loosening of the sealed connection at the annular sealing face 136 of the interior element 112, so that a blowout path, or venting path, between the interior of the container, or of the valve housing 112, and the outside is opened. This blowout path, or venting path, leads from the inside of the interior element 112, which is in communication with the container, through the bottom 127, provided with openings, of the connecting element 126, as well as back around its shell and through axial bores between the circumferential flange 131 and the gripping cap 111, to the exterior.

After the overpressure has been vented in this way, the overpressure compression spring 141 pushes the overpressure compression spring 117, or 144, back again into its active position in accordance with FIG. 5, in which it seals together with the diaphragm arrangement 116.

The invention claimed is:

1. A safety closure for containers which are under steam pressure, for devices in connection with household applications, such as steam irons, steam cleaning devices and the like, having:
   an interior element, which can be screwed on a filler opening of the container; and
   an exterior element in the form of a gripping cap;
   a coupling member provided between said interior element and said exterior element;
   a first spring; and
   a drive mechanism controlled by the pressure in the interior container in such a way that, with the container not under pressure, a connection, fixed against relative rotation, exists between said exterior element and said interior element, which is released when the container is under pressure, wherein:
   said drive mechanism includes a diaphragm, which is arranged on said exterior element between an annular sealing face on said interior element and a valve disk, which is charged by a second spring, said second spring being an axial overpressure compression spring;

said coupling member being movable against the action of said first spring; and said valve disk is embodied in the shape of a hood and constitutes on its inner end facing away from an annular contact face of said overpressure compression spring a radially interior axial guidance device for a diaphragm slide of said drive mechanism.

2. The safety closure in accordance with claim 1, wherein: by means of a shoulder the inner end of said valve disk constitutes an axial stop for said diaphragm slide.

3. The safety closure in accordance with claim 1, wherein: said interior element is locked axially and on the circumference with a stationary coupling element.

4. The safety closure in accordance with claim 1, wherein: said movable coupling member is held, radially fixed against relative rotation on the outside, but axially movable, in said exterior element and is provided with a radially centered axial cylinder, whose bottom is resiliently pressed against said diaphragm.

5. The safety closure in accordance with claim 1, wherein: said coupling member is provided radially on the inside with fastening strips, against which said overpressure compression spring rests.

6. The safety closure in accordance with claim 1, wherein: said coupling member fastened on said interior element is axially held in a suspended manner in said exterior element by means of an annular flange on the exterior circumference, but is circumferentially movable.

7. The safety closure in accordance with claim 1, wherein: said axially movable coupling member is provided with axial pegs, which engage bores in the bottom of said hood-like stationary coupling element.

* * * * *